July 26, 1938.  L. BRENDEL  2,124,685
ANTISEPTIC BUNG
Filed Feb. 23, 1937
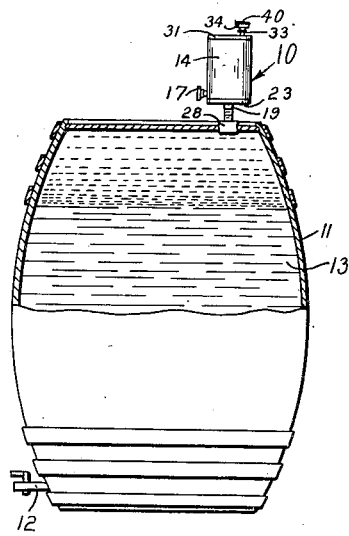
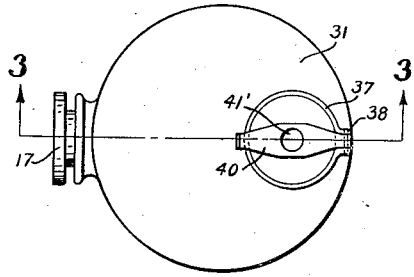
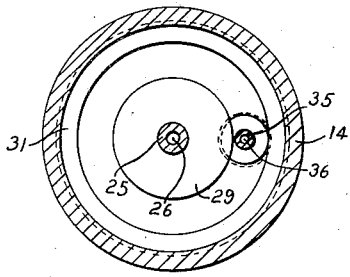
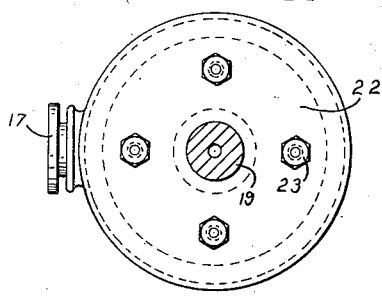
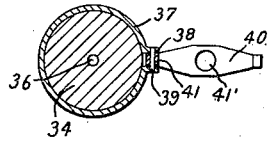
INVENTOR.
LEON BRENDEL
BY B. J. Craig
ATTORNEY.

UNITED STATES PATENT OFFICE 2,124,685

ANTISEPTIC BUNG

Leon Brendel, Ontario, Calif.

Application February 23, 1937, Serial No. 127,035

2 Claims. (Cl. 217—105)

This invention relates to an antiseptic bung.

The general object of the invention is to provide an improved bung for use in preventing the oxidizing of liquids.

A more specific object of the invention is to provide an improved venting bung wherein the atmospheric pressure within a container containing material such as wine is equalized when some of the material is withdrawn by air which passes into the container and is sterilized.

Another object of the invention is to provide an improved bung adapted to contain sulphurous acid and so constructed that air passing through the bung into a container will carry with it sulphur dioxide through contact with the sulphurous acid.

Other objects and the advantages of my invention will be apparent from the following description taken in connection with the accompanying drawing, wherein:

Fig. 1 is a side elevation partly in section showing a container with my bung applied thereto;

Fig. 2 is a top plan view of the bung;

Fig. 3 is a section taken on line 3—3 Fig. 2;

Fig. 4 is a section taken on line 4—4 Fig. 3;

Fig. 5 is a section taken on line 5—5 Fig. 3; and

Fig. 6 is a section taken on line 6—6 Fig. 3 with the sealing member in open position.

Referring to the drawing by reference characters I have shown my invention as embodied in a bung which is indicated generally at 10. As shown this bung is applied to a barrel 11 which is shown as provided with the usual spigot 12 and the barrel is adapted to contain oxidizable liquids such as wine indicated at 13 and which is adapted to be removed when the spigot 12 is opened.

It is well known that sulphurous acid is relatively unstable and decomposes into water and sulphur dioxide which latter is widely used as an antiseptic in the wine industry to prevent maladies of the wine.

This gas (SO₂) combines with the wine to a large extent and only the free SO₂ which has not combined with the wine serves to protect the latter. On account of this fact periodic injections of sulphur dioxide into the wine container are necessary for preservation. This is particularly true when the wine is stored where the temperature is high or when the wine is removed from the container in small quantities at long intervals of time.

The maladies of the wine are brought about by oxidation, from the surface of the liquid in the container, downward. Wine can be sulphured sufficiently to avoid re-fermentation without avoiding oxidation. Such oxidation of the wine, however, produces acetic acid which results from the action of acetic bacteria which exists on the surface of the wine in contact with the oxygen of the air. By providing the sulphur dioxide in replenished quantities so that the surface of the wine is covered this production of the acetic acid is prevented. The burning of sulphur upon the surface of wine in barrels is objectionable as is the blowing of sulphur dioxide into the container. Further the injection of compressed sulphur dioxide tends to produce a sulphur taste in the wine since the minimum quantity necessary cannot be accurately calculated.

My invention aims to overcome the difficulties mentioned above and to provide a practical method of introducing sulphur dioxide as an antiseptic by absorption of the gas into the container as the wine is drawn out. In this fashion the container is vented by air which passes through sulphurous acid so that the air becomes saturated with sulphur dioxide and thus passes into the upper portion of the container.

The bung 10 previously mentioned comprises a body 14 which may be made of glass, hard rubber or other material which is not attacked by sulphurous acid. This body 14 is preferably of cylindrical form and includes a bottom 15 and a threaded laterally arranged aperture 16 in which a drain plug 17 is inserted. The bottom 15 is provided with a recess 18 in which an attaching member 19 having a flange 20 is fitted. A gasket 21 engages the end of the member 19 while a retainer member 22 having a peripheral flange 23 engages the outer portion of the flange 20. The member 22 is held in place by bolts 23 which pass through apertures in the bottom of the body 14.

The bottom 15 of the body 14 includes an inwardly projecting portion 25 which is provided with an aperture 26 which extends entirely therethrough and through the member 19 as well as the gasket 21. The lower end of the attaching member 19 is threaded as at 27 and engages within a portion 28 which may be driven into an aperture in the barrel head.

The inner end of the projecting portion 25 is provided with a flange 29 which tends to prevent the liquid sulphurous acid from entering the aperture 26.

The upper end of the body 14 is provided with internal threads 30 which engage threads on a closure 31. A gasket 32 serves to provide a tight seal. The closure 31 is provided with a cylindrical boss 33 the interior of which is apertured and threaded to receive a closure member 34 which includes a downwardly extending tube portion 35. An aperture 36 extends through the closure member and the tubular portion 35 which terminates near the bottom 15 of the body 14.

Mounted about the closure member 34 I show a metal band 37 which includes end arms 38 through which a securing member 39 passes. This securing member supports a pivoted closure 40 which has its end 41 bent around the member 39 as shown in Fig. 3 and comprises an elongated strip having a conical projection 41' thereon which fits in a recess 42 which constitutes the upper end of the aperture 36.

In use the bung 10 is inserted in a barrel as shown in Fig. 1 and the closure member 31 is removed. Sulphurous acid is poured into the bung until the desired height is reached after which the closure 31 is returned to position and the closure member 40 is opened. When wine is withdrawn from the barrel through the bung 12 air passes through the aperture 36 on account of the partial vacuum from within the barrel. The air bubbles through the sulphurous acid in the body 14 thus becoming saturated with sulphur dioxide. The air passes through the barrel aperture 26 into the barrel carrying with it the sulphur dioxide. This sulphur dioxide then fills the upper part of the barrel. The sulphur dioxide tends to settle within the upper portion of the barrel just above the liquid so that the amount of sulphur dioxide nearest the liquid is greater than the amount farther above the liquid. In this way the maladies of the wine are prevented from forming and proper preservation is secured.

From the foregoing description it will be apparent that I have invented a novel bung which can be economically manufactured and which is highly efficient in use.

Having thus described my invention I claim:

1. In a bung, a body, said body having a bottom integral therewith, said bottom having a recess therein, an apertured attaching member having a flange fitting said recess, a gasket in said recess and engaged by said flange, the lower surface of said flange and said bottom being in the same plane and a flat retainer member secured to said bottom and engaging said flange.

2. In a bung, an open topped body, said body having a bottom with an attaching member thereon, a closure for the open top of said body, said closure including a threaded apertured boss, a threaded plug fitting said threaded boss, said plug including an inwardly extending tubular portion terminating adjacent the bottom of said body, said plug and said tubular member having an aperture therethrough, said plug having a band thereon, said band including spaced arms, a pivoted closure mounted on said spaced arms, said pivoted closure including a projection thereon fitting the aperture in said plug.

LEON BRENDEL.